(12) United States Patent
Chu

(10) Patent No.: US 9,297,297 B2
(45) Date of Patent: Mar. 29, 2016

(54) WASHER FOR REDUCING NOISE AND SYSTEM FOR REDUCING NOISE OF WASTEGATE VALVE APPARATUS BY USING THE SAME

(75) Inventor: Dong Ho Chu, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 743 days.

(21) Appl. No.: 13/601,051

(22) Filed: Aug. 31, 2012

(65) Prior Publication Data
US 2013/0139502 A1    Jun. 6, 2013

(30) Foreign Application Priority Data

Dec. 1, 2011 (KR) .......................... 10-2011-0127969

(51) Int. Cl.
| | |
|---|---|
| F16K 31/52 | (2006.01) |
| F02B 37/18 | (2006.01) |
| F02B 37/12 | (2006.01) |
| F16C 11/08 | (2006.01) |
| F16C 1/00 | (2006.01) |
| F16B 43/00 | (2006.01) |
| F16B 5/02 | (2006.01) |

(52) U.S. Cl.
CPC ................. *F02B 37/18* (2013.01); *F02B 37/12* (2013.01); *F02B 37/186* (2013.01); *F16C 1/00* (2013.01); *F16C 11/08* (2013.01); *F16K 31/52* (2013.01); *F16B 5/0241* (2013.01); *F16B 43/00* (2013.01); *Y02T 10/144* (2013.01)

(58) Field of Classification Search
CPC ........ F02B 37/18; F02B 37/186; F02B 37/12; F16F 1/00; F16C 11/08; F16B 5/0241; F16B 43/00; F16K 31/521; F16K 31/52

USPC .............. 251/279, 337, 280; 60/602; 384/49; 411/545; 74/470, 595; 403/119, 146, 403/149, 120, 145, 147, 148, 144
See application file for complete search history.

(56) References Cited

U.S. PATENT DOCUMENTS

| | | | | |
|---|---|---|---|---|
| 3,094,270 A | * | 6/1963 | Nelson et al. | 415/140 |
| 3,333,876 A | * | 8/1967 | Ho | 403/144 |
| 3,788,763 A | * | 1/1974 | Nickles | 415/147 |
| 4,018,104 A | * | 4/1977 | Bland et al. | 74/531 |
| 4,412,556 A | * | 11/1983 | Janich | 137/614.11 |

(Continued)

FOREIGN PATENT DOCUMENTS

| | | |
|---|---|---|
| KR | 10-2010-0032517 A | 3/2010 |
| KR | 10-2010-0113728 A | 10/2010 |

*Primary Examiner* — John K Fristoe, Jr.
*Assistant Examiner* — Andrew J Rost
(74) *Attorney, Agent, or Firm* — Morgan, Lewis & Bockius LLP

(57) ABSTRACT

A system for reducing noise of a wastegate valve apparatus including a bypass passage, a wastegate valve, an actuator and a link unit delivering the power of the actuator to the wastegate valve, may have a first link connected to the actuator, a third link connected to the wastegate valve, a second link provided with a rod disposed between the first link and the third link, wherein the second link includes a rod end ball bearing having a penetration hole into which a bolt member is inserted and a ball coupled to the penetration hole, and a joint connecting the rod and the third link, and a first washer disposed between the rod end ball bearing and the first link, wherein the first washer includes a support body, and an elastic member disposed between the first link and the support body.

6 Claims, 5 Drawing Sheets

(56) References Cited

U.S. PATENT DOCUMENTS

| | | | |
|---|---|---|---|
| 4,430,043 A * | 2/1984 | Knight et al. | 415/159 |
| 6,742,324 B2 * | 6/2004 | Bachelder et al. | 60/204 |
| 8,454,290 B2 * | 6/2013 | Schaser et al. | 411/544 |
| 2005/0220564 A1 * | 10/2005 | Hinson et al. | 411/353 |
| 2006/0133890 A1 * | 6/2006 | Etoile et al. | 403/122 |
| 2010/0211278 A1 | 8/2010 | Craig et al. | |

\* cited by examiner

WASHER FOR REDUCING NOISE AND SYSTEM FOR REDUCING NOISE OF WASTEGATE VALVE APPARATUS BY USING THE SAME

CROSS-REFERENCE TO RELATED APPLICATION

The present application claims priority to Korean Patent Application No. 10-2011-0127969 filed in the Korean Intellectual Property Office on Dec. 1, 2011, the entire contents of which is incorporated herein for all purposes by this reference.

BACKGROUND OF THE INVENTION

1. Field of the Invention

The present invention relates to a washer for reducing noise and a system for reducing noise of a wastegate valve apparatus by using the same, and more particularly to a washer for reducing noise and a system for reducing noise of a wastegate to reduce noise generated at links of a wastegate valve apparatus.

2. Description of Related Art

A wastegate valve apparatus is adapted to control rotation of a turbine of a turbocharger by controlling flow of exhaust gas according to a driving condition of an engine, and thereby to control an intake air amount flowing into a combustion chamber.

Generally, the wastegate valve apparatus includes a wastegate valve mounted in a bypass passage through which exhaust gas does not pass the turbine among paths of an exhaust gas from an exhaust manifold of an engine to an exhaust pipe, and an actuator operating the wastegate valve for opening or closing the bypass passage. Power generated by the actuator is delivered to the wastegate valve by a link connecting the wastegate valve with the actuator.

However, when the wastegate valve is open, for example, when the engine is initially started, vibration occurs at the wastegate valve and the link. Therefore, noise is generated at a respective link connecting the actuator with the wastegate valve.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a washer having advantages of reducing noise generated between links.

Various aspects of the present invention are directed to providing a washer that reduces noise and a system for reducing noise for a wastegate valve apparatus by using the same having advantages of efficiently reducing noise of the wastegate valve apparatus.

In an aspect of the present invention, a system for reducing noise of a wastegate valve apparatus may include a bypass passage connecting an exhaust manifold and an exhaust pipe, a wastegate valve adapted to open and close the bypass passage, an actuator generating power for operating the wastegate valve, and a link unit delivering the power of the actuator to the wastegate valve, wherein the link unit may have a first link connected to an operating shaft of the actuator, a third link connected to an operating shaft of the wastegate valve, a second link provided with a rod disposed between the first link and the third link and connected thereto, wherein the second link may include a rod end ball bearing pivotally connecting the rod and the first link and having a body provided with a penetration hole into which a bolt member is inserted and a ball coupled to the penetration hole, and a joint connecting the rod and the third link, and a first washer disposed between the rod end ball bearing and the first link and mounted around the bolt member, wherein the first washer may include a support body having an upper portion formed with a hole having a larger diameter than an external diameter of the ball of the rod end ball bearing and an extended portion extended and bent downwardly from a circumference of the hole, and an elastic member disposed between the first link and the support body.

Upper and lower portion of the ball protrude from the rod end ball bearing.

The extended portion is disposed apart from an outer surface of the ball of the rod end ball bearing and is curved downwardly from the circumference of the hole.

The system may further include a second washer disposed between the rod end ball bearing and a nut coupled to the bolt member.

The second washer may include a plurality of support plates, each of which is formed with a hole having a larger diameter than the exterior diameter of the ball of the rod end ball bearing, and a wave plate disposed between the support plates and formed with at least one wave.

The joint and the third link are connected by a coupling member, and the system may further include a snap ring provided on an end of the joint and fitted around a shaft of the coupling member.

In another aspect of the present invention, an apparatus for reducing noise of a link which connects an actuator generating power with an object operated by the power of the actuator, may include a rod adapted to deliver the power of the actuator, a rod end ball bearing connecting the object and the rod, and having a body provided with a penetration hole fitted on the bolt member and a ball coupled to the through hole, and a washer fitted on the bolt member connecting between the object and the rod end ball bearing so as to reduce a noise, wherein the washer is formed with a hole having a larger diameter than an external diameter of the ball of the rod end ball bearing.

Upper and lower portion of the ball protrude from the rod end ball bearing.

The washer may include the first washer disposed between the object and the rod end ball bearing, wherein the first washer may include a support body having an upper portion formed with a hole having a larger diameter than an external diameter of the ball of the rod end ball bearing, and an extended portion extended and bent downwardly from a circumference of the hole, and an elastic member disposed at an outer part of the extended portion.

The extended portion is disposed apart from an outer surface of the ball of the rod end ball bearing and is curved downwardly from the circumference of the hole.

The washer may include a second washer disposed between the rod end ball bearing and a nut coupled to the bolt member.

The second washer may include a plurality of support plates, each of which is formed with a hole having a larger diameter than the exterior diameter of the ball of the rod end ball bearing, and a wave plate disposed between the support plates and formed with at least one wave.

In further another aspect of the present invention, a washer for reducing noise that occurs between a rod end ball bearing mounted at an end of a rod delivering power of a machine and a connecting object coupled to the rod end ball bearing by a bolt member, may include a support body having an upper portion formed with a hole having a larger diameter than an external diameter of a ball of the rod end ball bearing, and an extended portion extended and bent downwardly from a circumference of the hole, and an elastic member disposed at an outer part of the extended portion.

Upper and lower portion of the ball protrude from the rod end ball bearing.

The extended portion is disposed apart from an outer surface of the ball of the rod end ball bearing and is curved downwardly from the circumference of the hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
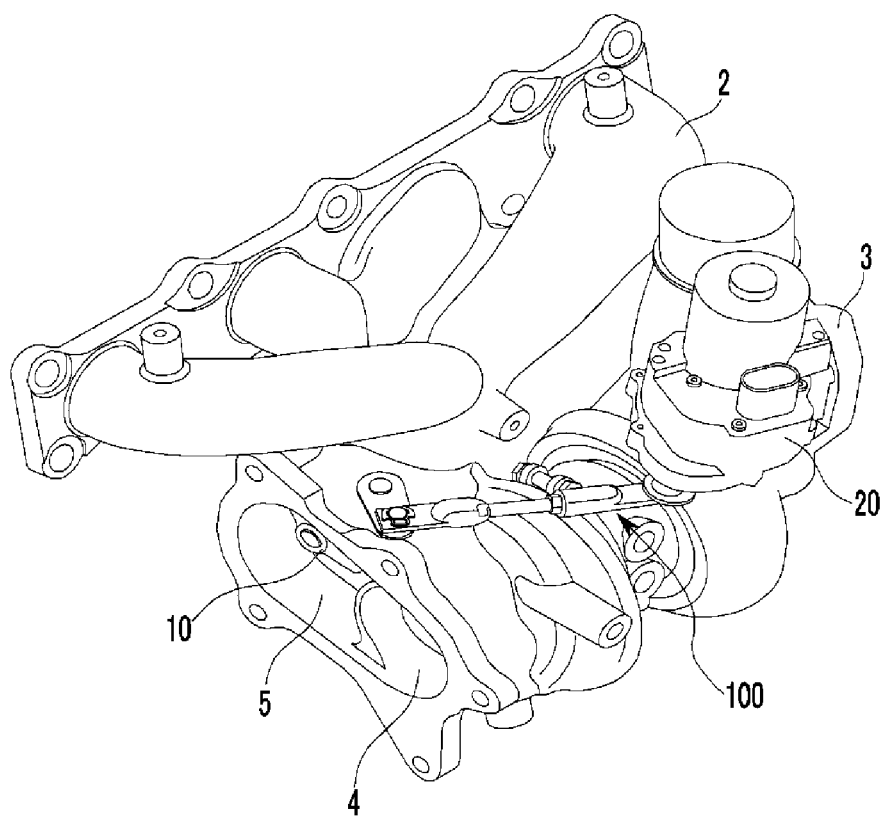
FIG. 1 is a schematic diagram of an exhaust system including a system for reducing noise of a wastegate valve apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings so as to be easily practiced by a person skilled in the art.

Such exemplary embodiments are exemplary embodiments according to an exemplary embodiment of the present invention. Since a person skilled in the art can realize the present invention in various forms, it is to be understood that the scope of the present invention is not limited to exemplary embodiments which will be hereinafter described.

Figure 2:
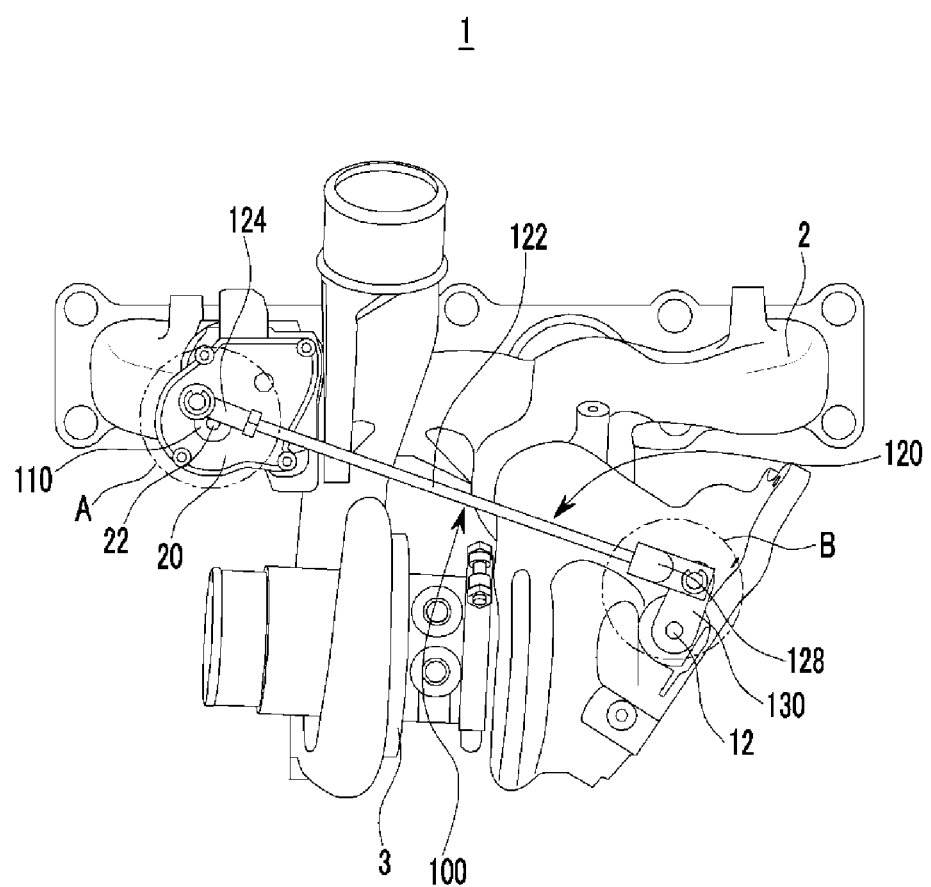
FIG. 2 shows a back surface of the exhaust system in FIG. 1.
Figure 3:
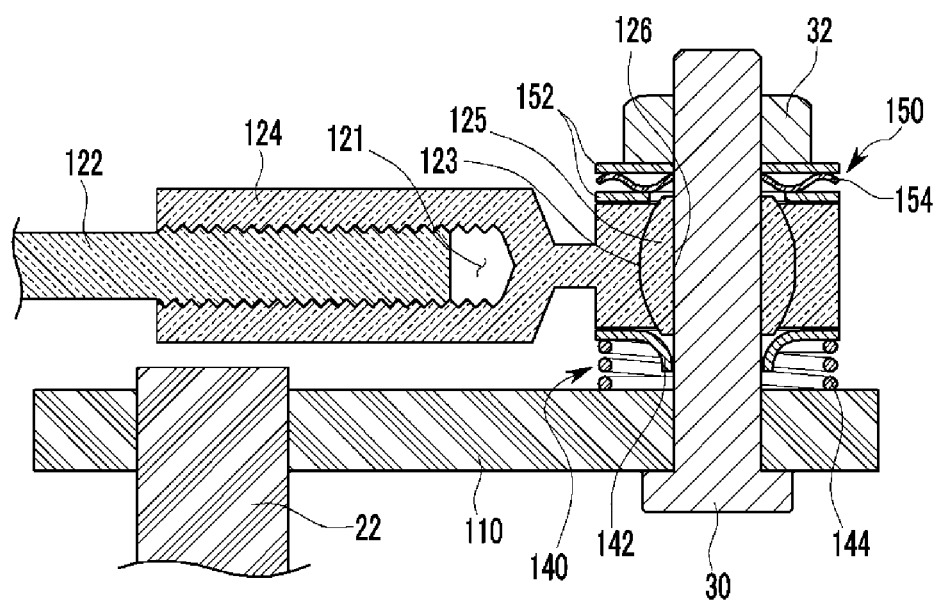
FIG. 3 is a cross-sectional view showing an 'A' portion in FIG. 2.
Figure 4:
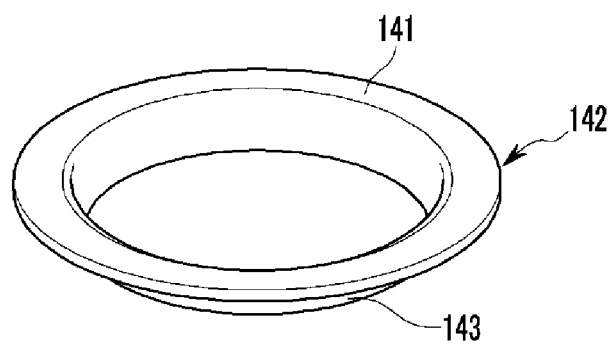
FIG. 4 is a perspective view of the first washer according to an exemplary embodiment of the present invention.
Figure 4:
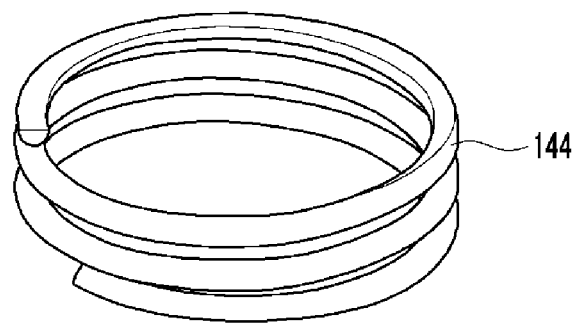
Figure 5:
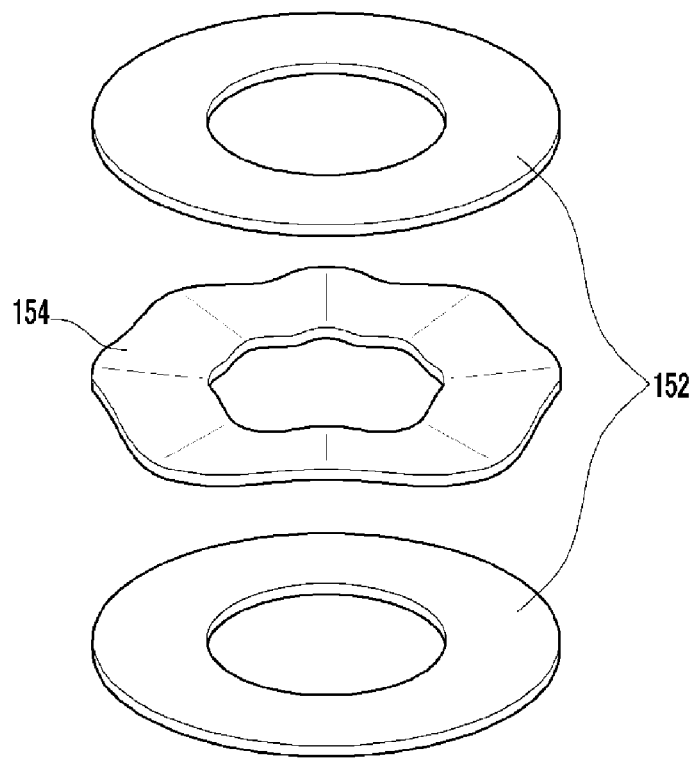
FIG. 5 is a perspective view of the second washer according to an exemplary embodiment of the present invention.
Figure 6:
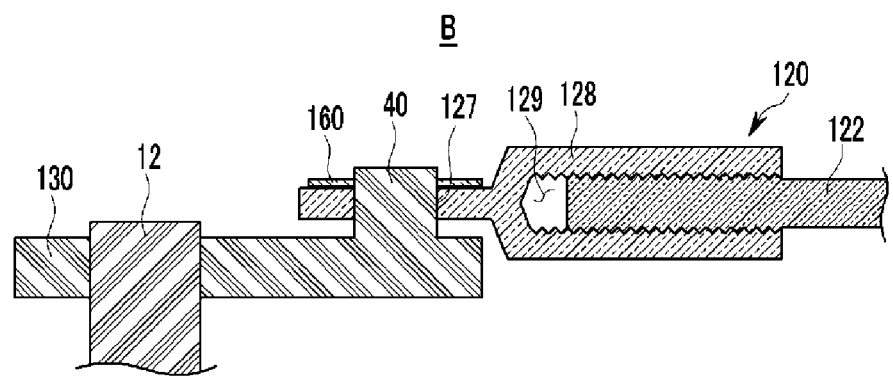
FIG. 6 is a cross-sectional view for showing a 'B' portion in FIG. 2.

FIG. 1 is a schematic diagram of an exhaust system including a system for reducing noise of a wastegate valve apparatus according to an exemplary embodiment of the present invention, FIG. 2 shows a back surface of the exhaust system in FIG. 1, FIG. 3 is a cross-sectional view for showing an 'A' portion in FIG. 2, FIG. 4 is a perspective view of the first washer according to an exemplary embodiment of the present invention, FIG. 5 is a perspective view of the second washer according to an exemplary embodiment of the present invention, and FIG. 6 is a cross-sectional view for showing a 'B' portion in FIG. 2.

Referring to FIG. 1 and FIG. 2, a system 1 for reducing noise of a wastegate valve apparatus according to an exemplary embodiment of the present invention includes a wastegate valve 10, an actuator 20, and a link 100.

Exhaust gas exhausted from an exhaust manifold 2 of an engine is exhausted to an exhaust pipe 4 through a turbine of a turbocharger 3, and the turbine drives a compressor so as to compress air flowing into an intake system of the engine.

Since the wastegate valve apparatus controls opening and closing of a bypass passage 5, the exhaust gas exhausted from the exhaust manifold 1 can be exhausted directly to the exhaust pipe 4 through the bypass passage 5, while not passing through the turbine.

The wastegate valve apparatus includes the wastegate valve 10 adapted to open and close the bypass passage 5, the actuator 20 generating power for operating the wastegate valve 10, and the link 100 delivering the power of the actuator to the wastegate valve.

The link 100 includes a first link 110, a second link 120, a third link 130, a first washer 140, a second washer 150, and a third washer 160.

The first link 110 is connected to an operating shaft 22 of the actuator 20, the second link 120 is connected to an operating shaft 12 of the wastegate valve 10, and the third link 130 connects the first link 110 with the second link 120. The power generated by the actuator 20 is delivered to the first link 110 by the operating shaft 22 of the actuator 20, and is then delivered to the operating shaft 12 of the wastegate valve 10 by the second link 120 and the third link 130. Therefore, the wastegate valve 10 is adapted to open and close the bypass passage 5 by the power delivered by the operating shaft 12 of the wastegate valve 10.

The second link 120 includes a rod 122 disposed between the first link 110 and the third link 130, a rod end ball bearing 124 connecting the rod 122 with the first link 110, and a joint 128 connecting the rod 122 with the third link 130.

The rod end ball bearing 124 is mounted at an end of the rod delivering power of a machine generally, and a body of the rod end ball bearing 124 is formed with an insertion hole 121 into which the rod is inserted and a penetration hole 123 into which a bolt member 30 for coupling the rod end bearing and an object such as the first link 110 is inserted. A ball 125 of the rod end ball bearing 124 is inserted into an interior circumference of the penetration hole 123 and formed with a pivot hole 126 in which the bolt member 30 is inserted. The ball 125 functions as a bearing. Some portion of the ball 125 is protruded from the body. That is, the thickness of the body is larger than that of the ball 125. In an exemplary embodiment of the present invention, upper and lower portion of the ball 125 protrude from the rod end ball bearing 124.

The joint 128 is formed with an insertion hole 129 in which the rod is inserted, and a penetration hole 127 in which a coupling member connecting the second link 120 and the joint 128 is inserted.

Referring to FIG. 3 and FIG. 4, the first washer 140 is disposed between the rod end ball bearing 124 and the first link 110, and is placed on the bolt member. The first washer 140 reduces vibration occurring between the rod end ball bearing 124 and the first link 110 such that noise generated by them is reduced. The first washer 140 includes a support body 142 and an elastic member 144.

The support body 142 supports the body of the rod end ball bearing 124, and includes an upper portion 141 formed with a hole having a larger diameter than an external diameter of the ball 125 of the rod end ball bearing 124, and an extended portion 143 extended and bent downwardly from a circumference of the hole. The extended portion 143 is disposed apart from an outer surface of the ball 125 of the rod end ball bearing 124, and can be curved from the circumference of the hole in various forms. According to an exemplary embodiment, the extended portion 143 can surround the ball 125 of the rod end ball bearing 124 and be curved from the circumference of the hole. The support body 142 supports only the body of the rod end ball bearing 124 and does not support the ball 125. If the support body 142 supports the ball 125, when the rod 122 moves, the support 142 hinders movement of the ball 125 such that stress is concentrated.

The elastic member 144 is disposed at an outer portion of the extended portion 143 and reduces an axial movement of the bolt member 30. The elastic member 144 can be provided as various types. According to an exemplary embodiment, the elastic member 144 is a spring.

Referring to FIG. 3 and FIG. 5, the second washer 150 is disposed between the rod end ball bearing 124 and a nut 32 coupled to the bolt member 30. The second washer 150 reduces vibration occurring between the rod end ball bearing 124 and the nut such that noise generated by them is reduced. The second washer 150 includes a support plate 152 and a wave plate 154.

A plurality of support plates 152 are provided, and each of the support plates 152 is formed with a hole having a larger diameter than the exterior diameter of the ball of the rod end ball bearing 124. The wave plate 154 is disposed between the support plates 152 and is formed with at least one wave. When the vibration occurs, the wave plate 154 reduces the vibration such that the noise is reduced.

Referring to FIG. 3 and FIG. 6, the third washer 160 is disposed between the third link 130 and the joint 128 in a case that the third link 130 is connected to the joint 128 by the coupling member 40. The third washer 160 is provided as various types. According to an exemplary embodiment, the third washer 160 can be a snap ring.

According to an exemplary embodiment, the second link 120 and the third link 130 are connected by, but not limited to, the joint. The second link 120 and the third link 130 can be connected by the rod end ball bearing. Connected by the rod end ball bearing 124, the first washer 140 and/or the second washer 150 are/is disposed between the rod end ball bearing and the third link and/or the nut.

The present invention may reduce the noise occurring between the links.

The present invention may efficiently reduce the noise of the wastegate valve apparatus.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for reducing noise of a wastegate valve apparatus that comprises a bypass passage connecting an exhaust manifold and an exhaust pipe, a wastegate valve adapted to open and close the bypass passage, an actuator generating power for operating the wastegate valve, and a link unit delivering the power of the actuator to the wastegate valve, wherein the link unit comprises:

a first link connected to an operating shaft of the actuator;

a third link connected to an operating shaft of the wastegate valve;

a second link provided with a rod disposed between the first link and the third link and connected thereto, wherein the second link includes:

a rod end ball bearing pivotally connecting the rod and the first link and having a body provided with a penetration hole into which a bolt member is inserted and a ball coupled to the penetration hole; and a joint connecting the rod and the third link; and a first washer disposed between the rod end ball bearing and the first link and mounted around the bolt member, wherein the first washer includes a support body having an upper portion formed with a hole having a larger diameter than an external diameter of the ball of the rod end ball bearing and an extended portion extended and bent downwardly from a circumference of the hole, and an elastic member disposed between the first link and the support body.

2. The system of claim 1, wherein upper and lower portion of the ball protrude from the rod end ball bearing.

3. The system of claim 1, wherein the extended portion is disposed apart from an outer surface of the ball of the rod end ball bearing and is curved downwardly from the circumference of the hole.

4. The system of claim 1, further including a second washer disposed between the rod end ball bearing and a nut coupled to the bolt member.

5. The system of claim 4, wherein the second washer includes:

a plurality of support plates, each of which is formed with a hole having a larger diameter than the exterior diameter of the ball of the rod end ball bearing; and a wave plate disposed between the support plates and formed with at least one wave.

6. The system of claim 1, wherein the joint and the third link are connected by a coupling member, and
the system further includes a snap ring provided on an end of the joint and fitted around a shaft of the coupling member.

* * * * *